United States Patent
Paisley et al.

(10) Patent No.: US 6,572,066 B1
(45) Date of Patent: Jun. 3, 2003

(54) SINGLE-PIECE SPRING-STEEL SEAT ADJUSTER LATCH

(75) Inventors: Thomas William Paisley, Warren, IL (US); Pascal Emanuel Garrido, Kilworthy (CA)

(73) Assignee: Dura Global Technologies, Rochester Hills, MI (US)

( * ) Notice: Subject to any disclaimer, the term of this patent is extended or adjusted under 35 U.S.C. 154(b) by 4 days.

(21) Appl. No.: 09/702,628

(22) Filed: Oct. 31, 2000

(51) Int. Cl.[7] .................................... F16M 13/00
(52) U.S. Cl. .................... 248/429; 248/430; 296/65.13; 297/344.1
(58) Field of Search ................... 248/429, 430; 297/344.1, 463.1; 296/65.13, 65.14

(56) References Cited

U.S. PATENT DOCUMENTS

| | | | | |
|---|---|---|---|---|
| 3,450,425 A | * | 6/1969 | Leonhardt | 297/344.1 |
| 4,168,051 A | * | 9/1979 | Terada | 248/429 |
| 4,204,658 A | * | 5/1980 | Courtois | 248/430 |
| 4,572,469 A | * | 2/1986 | Rees | 248/430 |
| 4,961,559 A | * | 10/1990 | Raymor | 248/429 |
| 5,286,076 A | * | 2/1994 | DeVoss et al. | 296/65.1 |
| 5,358,207 A | * | 10/1994 | West | 248/430 |
| 5,531,503 A | * | 7/1996 | Hughes | 297/341 |
| 5,806,825 A | | 9/1998 | Couasnon | 248/429 |
| 5,918,847 A | * | 7/1999 | Couasnon | 248/429 |
| 6,036,157 A | | 3/2000 | Baroui | 248/429 |
| 6,086,154 A | * | 7/2000 | Mathey et al. | 297/341 |

* cited by examiner

Primary Examiner—Leslie A. Braun
Assistant Examiner—Tan Le
(74) Attorney, Agent, or Firm—Casimir R. Kiczek

(57) ABSTRACT

A seat track assembly for a motor vehicle includes a first or lower track assembly comprising a lower track, a second or upper track assembly operably connected to the lower track assembly and comprising an upper track movable relative to the first track, and a latch selectively movable from a latching position wherein the upper track is secured with respect to the lower track and an unlatching position wherein the upper track is movable with respect to the lower track. The upper track has a generally vertical side wall and the latch extends laterally adjacent the side wall. The latch includes an attachment portion secured to the upper track, a latch portion adapted to cooperate with the lower track to form an interlock therebetween and substantially prevent movement of the upper track relative to the lower track, and an intermediate portion connecting the attachment portion and the latch portion. The latch is preferably a unitary member formed of spring steel. The attachment portion preferably forms a snap-fit connection with the upper track. The intermediate portion preferably includes a pair of longitudinally extending, parallel and vertically spaced apart legs which form a double leaf spring to bias the latch portion toward the latching position. The latch portion preferably has a plurality of windows which cooperate with locking teeth of the lower track to form the interlock or a plurality of locking teeth which cooperate with the windows of the lower track to form the interlock.

20 Claims, 6 Drawing Sheets

SINGLE-PIECE SPRING-STEEL SEAT ADJUSTER LATCH

FIELD OF THE INVENTION

The present invention generally relates to a seat track assembly and, more particularly, to a lock mechanism for selectively holding the seat track assembly in a fixed position.

BACKGROUND OF THE INVENTION

Seat track assemblies are used to move a seat, typically in at least forward and rearward directions, in a motor vehicle. Such seat track assemblies typically have a first track assembly including a pair of parallel, laterally spaced-apart first slides or tracks and a second track assembly including a pair of parallel, laterally spaced-apart second slides or tracks, with each second track supported by and slidable on a corresponding one of the first tracks. The seat is mounted on the second tracks and are movable therewith relative to the first tracks. An adjuster lock or latch mechanism is provided to selectively secure the second tracks relative to the first tracks. Such latch mechanisms can be, for example, a latch with windows mounted on one track which engage teeth on the other track, or a latch with at least one tooth mounted on one track which engages an opening or notch in the other track. Typically, a handle or control bar, often referred to as a towel bar, is used to operate the latch between a latching or locking position and an unlatching or unlocking position. An occupant of the seat adjusts the position of the seat by actuating the handle to move the latch to an unlatching position, wherein the second tracks and seat are movable relative to the first tracks. The occupant moves the seat to a desired position and releases the handle such that the latch automatically returns to the latched position, wherein the second tracks and seat are not moveable relative to the first tracks.

Such latch mechanisms typically use a number of separate parts which is not conducive to low cost or rapid assembly of the seat track assemblies. U.S. Pat. No. 6,036,157, the disclosure of which is expressly incorporated herein its entirety by reference, discloses one attempt to solve this problem. The '157 patent discloses a latch which combines parts which perform locking and elastic recall functions into a single part. The latch, however, is relatively complex and expensive to produce and does not eliminate parts that perform other functions. Accordingly, there is a need in the art for an improved seat track assembly having a latch mechanism which reduces the number of parts required, has a relatively low cost to produce, and can be rapidly assembled.

SUMMARY OF THE INVENTION

The present invention provides a seat track assembly for a motor vehicle which overcomes at least some of the above-noted problems of the related art. According to the present invention, a seat track assembly comprises, in combination, a first track assembly comprising a first track, a second track assembly operably connected to the first track assembly and comprising a second track movable relative to the first track, and a latch movable from a latching position wherein the second track is secured with respect to the first track and an unlatching position wherein the second track is movable with respect to the first track. The latch includes an attachment portion secured to the second track, a latch portion adapted to cooperate with the first track to form an interlock therebetween and substantially prevent movement of the second track relative to the first track, and an intermediate portion connecting the attachment portion and the latch portion. A snap-fit connection is provided between the attachment portion and the first track so that mechanical fasteners can be eliminated.

According to another aspect of the present invention, a seat track assembly comprises, in combination, a first track assembly comprising a first track, a second track assembly operably connected to the first track assembly and comprising a second track movable relative to the first track, and a latch movable from a latching position wherein the second track is secured with respect to the first track and an unlatching position wherein the second track is movable with respect to the first track. The first track has a generally vertical side wall. The latch includes an attachment portion secured to the second track, a latch portion adapted to cooperate with the first track to form an interlock therebetween and substantially prevent movement of the second track relative to the first track, and an intermediate portion connecting the attachment portion and the latch portion. The latch longitudinally extends adjacent the side wall of the second track such that the latch is not limited by height restrictions which are present when the latch is located above the upper track.

According to yet another aspect of the present invention, a seat track assembly comprises, in combination, a first track assembly comprising a first track, a second track assembly operably connected to the first track assembly and comprising a second track movable relative to the first track, and a latch movable from a latching position wherein the second track is secured with respect to the first track and an unlatching position wherein the second track is movable with respect to the first track. The latch includes an attachment portion secured to the second track, a latch portion adapted to cooperate with the first track to form an interlock therebetween and substantially prevent movement of the second track, relative to the first track, and an intermediate portion connecting the attachment portion and the latch portion. The intermediate portion includes a pair of longitudinally extending, parallel and vertically spaced-apart legs which form a double leaf spring to resiliently bias the latch portion toward the latching position.

From the foregoing disclosure and the following more detailed description of various preferred embodiments it will be apparent to those skilled in the art that the present invention provides a significant advance in the technology and art of seat track mechanisms. Particularly significant in this regard is the potential the invention affords for providing a high quality, reliable, light weight, easily assembled, low cost assembly. Additional features and advantages of various preferred embodiments will be better understood in view of the detailed description provided below.

BRIEF DESCRIPTION OF THE DRAWINGS

These and further features of the present invention will be apparent with reference to the following description and drawings, wherein:

FIG. 6 is a top plan view of a latch of the latch mechanism of FIGS. 1 to 5;

FIG. 7 is a side-elevational view of the latch of FIG. 6;

FIG. 8 is an end elevational view of the latch of FIGS. 6 and 7;

FIG. 9 is a cross-sectional view of the latch of FIGS. 6 to 8 taken along line 9—9 of FIG. 7;

FIG. 10 is a cross-sectional view of the latch of FIGS. 6 to 9 taken along line 10—10 of FIG. 7;

FIG. 11 is a cross-sectional view of the latch of FIGS. 6 to 10 taken along line 11—11 of FIG. 7;

FIG. 12 is a cross-sectional view of the latch of FIGS. 6 to 11 taken along line 12—12 of FIG. 7;

Figure 1:
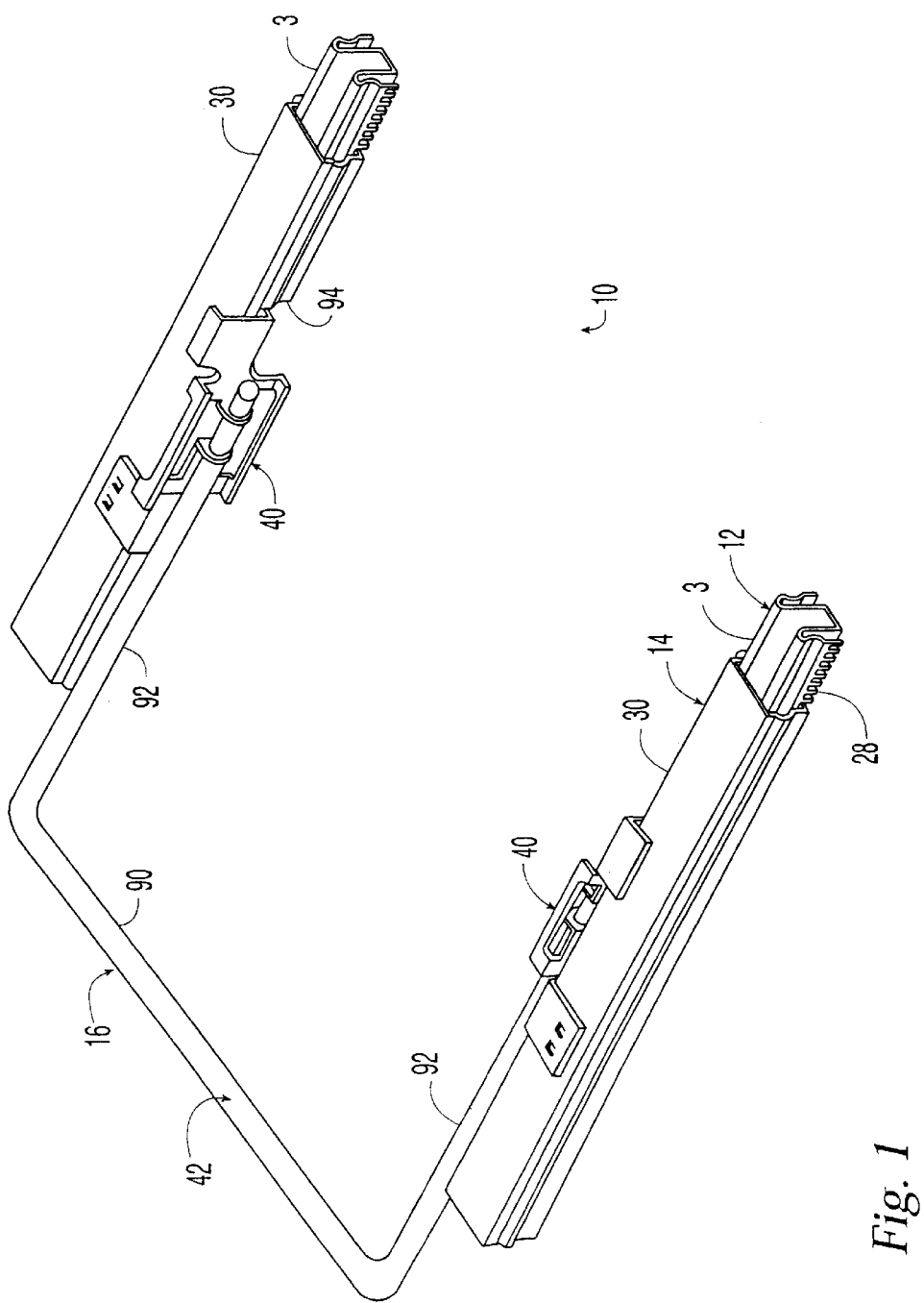
FIG. 1 is a perspective view of a seat track assembly according a first preferred embodiment of the present invention, wherein parts are removed for clarity.

It should be understood that the appended drawings are not necessarily to scale, presenting a somewhat simplified representation of various preferred features illustrative of the basic principles of the invention. The specific design features of the seat track assembly as disclosed herein, including, for example, specific dimensions, orientations, and shapes of the latch and tracks will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the seat track assemblies illustrated in the drawings. In general, up or upward refers to an upward direction in the plane of the paper in FIGS. 2–5 and 14–17 and down or downward refers to a downward direction in the plane of the paper in FIGS. 2–5 and 14–17. Also in general, fore or forward refers to a direction toward the front of the motor vehicle, that is, in a direction in the plane of the paper toward the left of the figure in FIGS. 2 and 4 and toward the right in FIGS. 14 and 16 and aft or rearward refers to a direction toward the rear of the motor vehicle, that is, in a direction in the plane of the paper toward the right of the figure in FIGS. 2 and 4 and toward the left in FIGS. 14 and 16.

DETAILED DESCRIPTION OF CERTAIN PREFERRED EMBODIMENTS

It will be apparent to those skilled in the art, that is, to those who have knowledge or experience in this area of technology, that many uses and design variations are possible for the improved seat track assemblies disclosed herein. The following detailed discussion of various alternative and preferred embodiments will illustrate the general principles of the invention with reference to a seat track assembly for use with a motor vehicle. Other embodiments suitable for other applications will be apparent to those skilled in the art given the benefit of this disclosure. The term "snap-fit" connection is used herein and in the claims to mean a connection between at least two components wherein at least one of the components has a protrusion or abutment which engages the other component to form an interlock or interference which retains the components together when they are connected and at least one of the components has a resiliently deformable or deflectable portion such that the deflectable portion deflects to remove the interference as the parts are brought together and resiliently snaps back to reform the interference when the components are together. The term "unitary" member is used herein and in the claims to mean a member made of a single continuous material.

Figure 2:
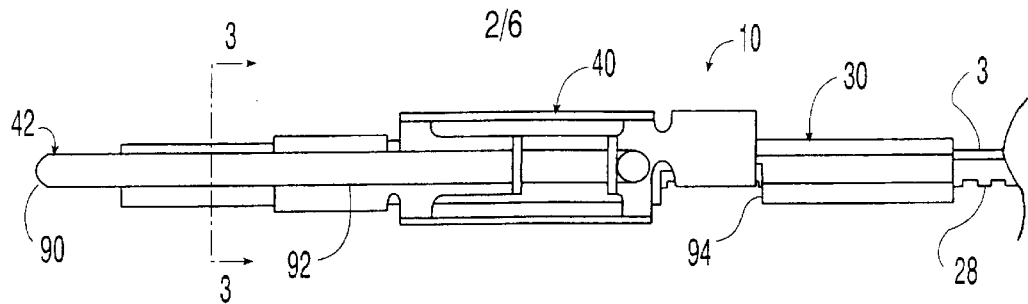
FIG. 2 is a fragmented left-side elevational view of the seat track assembly of FIG. 1, wherein a latch mechanism is in a latching position.
Figure 3:
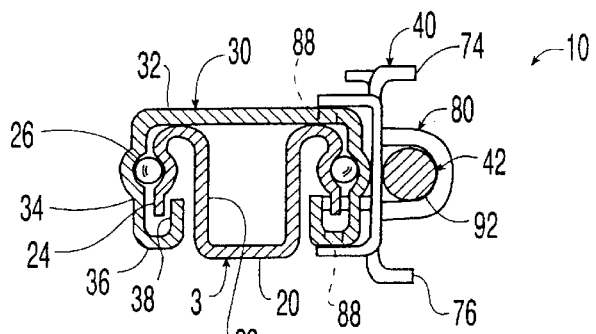
FIG. 3 is a cross-sectional view of the seat track assembly of FIGS. 1 and 2 taken along line 3—3 of FIG. 2.

Referring now to the drawings, FIGS. 1 to 3 show a seat track assembly 10 for a motor vehicle, such as an automobile, according to a preferred embodiment of the present invention. While the illustrated embodiments of the present invention are particularly adapted for use with an automobile, it is noted that the present invention can be utilized with any motor vehicle having an adjustable seat including trucks, buses, vans, recreational vehicles, earth moving equipment and the like, off road vehicles such as dune buggies and the like, air borne vehicles, and water borne vehicles.

As shown in FIGS. 1–3, the seat track assembly 10 includes a first or lower track assembly 12 to be mounted in a fixed position relative to the motor vehicle floor, a second or upper track assembly 14 carrying a seat and selectively movable relative to the lower track assembly 12, and an adjustment lock or latch mechanism 16 to secure the lower and upper track assemblies 12, 14 together and substantially prevent relative movement therebetween. The seat (not specifically shown), typically includes a seat base and a seat back pivotally mounted to the seat base by a seat hinge as known in the art. A seat track mount or riser is commonly provided to raise the seat above the motor vehicle floor and to align the seat at an ergonomically acceptable angle. The seat track mount may be part of the lower track assembly 12, part of the upper track assembly 14, or part of both.

The lower track assembly 12 includes at least two parallel and laterally spaced-apart lower slides or tracks 18. As best shown in FIG. 3, each illustrated lower track 18 is generally "U-shaped" and open at the top. The lower track 18 has a generally horizontal bottom wall 20, a pair of generally vertical side walls 22 upwardly extending form opposed lateral edges of the bottom wall 20, and down-turned flanges 24 generally vertically extending from the top edges of the side walls 22 and laterally spaced-apart from the side walls 22. The flanges 24 preferably form raceways for bearings or balls 26 as described in more detail hereinafter. A plurality of downwardly extending locking teeth 28 are formed along the lower edges of the flanges 24. The locking teeth 28 are sized and shaped to cooperate with the latch mechanism 16 as described in more detail hereinafter. The walls and flanges 20, 22, 24 of the lower track 18 are preferably unitary, that is, formed from a single piece of material. The lower track 18 is formed of any suitable rigid material such as, for example, steel.

The upper track assembly 14 includes at least two parallel and laterally spaced-apart upper slides or tracks 30 which are adapted to cooperate with corresponding lower tracks such that they are slidable thereon. The illustrated upper tracks 30 are slidable over the lower tracks 18. As best shown in FIG. 3, each illustrated upper track 30 is generally "inverted-U-shaped" and open at the bottom. The lower track 30 has a generally horizontal top wall 32, a pair of generally vertical side walls 34 downwardly extending form opposed lateral edges of the top wall 32, a pair of generally horizontal bottom walls 36 inwardly extending from the bottom edges of the side walls 34, and up-turned flanges 38 generally vertically extending from the inner edges of the bottom walls 36 and laterally spaced-apart from the side walls 34. The upper track 30 is preferably sized and shaped to cooperate with the lower track 18 to slidably receive the lower track 18 therein with the side walls 34 of the upper track laterally spaced outside the side walls 22 of the lower track 18 and the flanges 38 of the upper track 30 extending between the side walls 22 and flanges 24 of the lower track 18. The side walls 34 preferably form raceways for the balls 26 such that the balls 26 are retained between the side walls 34 of the upper track 30 and the flanges 24 of the lower track 18 to facilitate relative sliding movement between the upper and lower tracks 18, 30. The walls and flanges 32, 34, 36, 38 of the upper track 30 are preferably unitary, that is, formed from a single piece of material. The upper track 30 is formed of any suitable rigid material such as, for example, steel. It will be readily apparent to those skilled in the art, given the benefit of this disclosure, that that the lower and upper tracks 18, 30 can be modified to have many different shapes and sizes without falling outside the scope of the present invention.

The latch mechanism 16 includes a pair of locks or latches 40 secured to corresponding upper tracks 30 and a release member 42, such as the illustrated control arm or towel bar, operably connected to each of the latches 40 to selectively move the latches 40 from a latching position wherein the upper and lower tracks 18, 30 are interlocked to substantially prevent movement therebetween to an unlatched position wherein the upper tracks 30 are free to move relative to the lower tracks 18. The latches 40 are essentially mirror images of one another. Accordingly, further discussion will focus on one of the latches 40 with the understanding that the other latch 40 is constructed in substantially the same manner and operates in substantially the same manner. It will be readily apparent to those skilled in the art, given the benefit of this disclosure, that only one of the latches 40 can be used eliminating the other or replacing it with a conventional or other latch.

Each latch 40 longitudinally extends along and adjacent the outer side wall 34 of the corresponding upper track 30 and are symmetrically positioned along the upper tracks 30. As best shown in FIGS. 6–12, each latch 40 includes an attachment portion 44 for securing the latch 40 to the upper track 30, a movable latch portion 46 for interlocking the lower and upper tracks 18, 30 when in the latching position, and a flexible intermediary or connection portion 48 connecting the attachment and latch portions 44, 46.

The illustrated attachment portion 44 is adapted for a "snap-fit" connection with the upper track 30 such that the latch 40 is rigidly secured to the upper track 30 to substantially prevent relative movement therebetween without the use of fasteners or other separate components. The illustrated attachment portion 44 is generally lazy-U-shaped having an open inner side. The attachment portion 44 has a generally vertical side wall 50, and generally horizontal, substantially parallel and vertically spaced-apart top and bottom walls 52, 54 inwardly extending from top and bottom edges of the side wall 50. The top and bottom walls 52, 54 are each provided with a pair of longitudinally spaced-apart abutments 56 on their respective inner sides which face the inner side of the side wall 50. The illustrated abutments 56 are formed by bent tabs 58 that are inwardly inclined from the top and bottom walls 52, 54. It is noted that a fewer or greater number of abutments 56 can be utilized. It will be readily apparent to those skilled in the art, given the benefit of this disclosure, that that the abutments 56 can be formed in other manners. It will also be readily apparent to those skilled in the art, given the benefit of this disclosure, that other types of attachment portions 44 can be utilized, such as for use with mechanical fasteners, and/or that other configurations of snap-fit connections can be utilized, such as tabs 58 on the upper track 30 and openings in the latch attachment portion 44.

The illustrated movable latch portion 46 is adapted for cooperating with the locking teeth 28 of the lower track 18 when in the latching position to interlock the lower and upper tracks 18, 30 and prevent relative movement therebetween. The illustrated latch portion 46 is generally lazy-U-shaped having an open inner side. The attachment portion 46 has a generally vertical side wall 60, and generally horizontal, substantially parallel and vertically spaced-apart top and bottom walls 62, 64 inwardly extending from top and bottom edges of the side wall 60. The illustrated bottom wall 64 extends a further lateral distance than the top wall 62 and is provided with three spaced apart windows or openings 66 sized and shaped to receive three of the locking teeth 28 therein. Each window 66 forms opposed forward and rearward abutments 68 for engaging the forward and rearward edges of the locking teeth 28. It is noted that a fewer or greater number of windows 66 can be utilized. It will be readily apparent to those skilled in the art, given the benefit of this disclosure, that that the latch portion 44 can be formed in other manners such as the windows 66 can be open on one side such that interlocking teeth 28 are formed.

The flexible intermediary portion 48 is adapted to connect the attachment and latch portions 44, 46 and to permit resilient movement of the latch portion 46 between the latching position to the unlatching position. The illustrated intermediary portion 48 has first and second generally vertical and spaced apart webs 70, 72 generally located in the same plane and a pair of generally horizontal, substantially parallel, and vertically spaced-apart upper and lower leaves or legs 74, 76. The first web 70 is connected to the attachment portion 44 and the second web 72 is connected to the latch portion 46. The upper and lower legs 74, 76 outwardly extend from the first and second webs 70, 72 and connect the first and second webs 70, 72. The upper leg 74 extends from the top edges of the first and second webs 70, 72 and the second leg 76 extends from the bottom edge of the first and second webs 70, 72. Formed in this manner, the upper and lower legs each form a horizontal planar leaf spring and the intermediate portion 48 forms a double leaf spring comprising a pair of vertically spaced-apart leaf springs. The upper and lower legs 74, 76 also act to form a four bar linkage with the attachment and lock portions 44, 46 such that the lock portion 46 remains horizontal, that is parallel with the lower and upper tracks 18, 30, as it is moved in a vertical direction. One benefit of this configuration is that it holds the lock portion 46 of the latch 40 parallel with the row of locking teeth 28 on the lower track 18 as the latch 40 opens and thus reduces the tendency of most pivoting latches to cam open on impact The latch 40 also preferably includes an unitary release member or towel bar attachment portion 78. The illustrated release member attachment portion 78 includes first and second flanges 80, 82. The first flange 80 is generally vertical and laterally extends in an outward direction such that it is substantially perpendicular to the upper track side wall 34 when the latch 40 is attached to the upper track 30 and is connected to the first web 70 of the intermediary portion 48. As best shown in FIG. 10, the first flange 80 is vertically located between the legs 74, 76 of the intermediary portion 48 and is provided with an opening 84 sized and shaped for receiving the towel bar 42 therethrough. The second flange 82 is generally vertical and laterally extends in an outward direction such that it is substantially perpendicular to the upper track side wall 34 when the latch 40 is attached to the upper track 30 and is generally parallel and spaced apart from the first flange 80. The illustrated second flange 82 is connected to the second web 72 of the intermediary portion 48. As best shown in FIG. 11, the second flange 82 is vertically located between the legs 74, 76 of the intermediary portion 48 and is provided with an opening 86 sized and shaped for receiving the release member 42 therethrough. The openings 84, 86 of the first and second flanges 80, 82 are generally coaxial, longitudinally spaced-apart, and adapted to cooperate with the release member 42 as described in more detail hereinafter.

The latch 40 is preferably unitary, that is, formed from a single piece of material such as, for example, by stamping a flat cut out from sheet stock and then bending the cut out to obtain the desired latch. The latch 40 can be formed from any suitable resilient material such as, for example, spring steel.

As best shown in FIG. 3, the illustrated latch 40 is secured to the upper track 30 by resiliently snapping the attachment portion 44 over the outer side wall 34 and top and bottom walls 32, 36 of the upper track 30 such that top and bottom walls 62, 64 of the attachment portion 44 are outwardly deflected until the tabs 58 are received in cooperating windows or openings 88 in the top and bottom walls 32, 36 of the upper track 30. Secured in this position, the side wall 60 of the latch attachment portion 44 engages the side wall 34 of the upper track 30, the top wall 62 of the latch attachment portion 44 engages the top wall 32 of the upper track 30, and the bottom wall 64 of the attachment portion 44 engages the bottom wall 36 of the upper track 30. Outward lateral, relative movement between the latch 40 and the upper track 30 is substantially prevented because abutments 56 of the tabs 58 engage the edges of the openings 88. Longitudinal, relative movement between the latch 40 and the upper track 30 is substantially prevented because sides of the tabs 78 engage the edges of the openings 88. If desired, the latch 40 can be removed by resiliently, outwardly deflecting the top and bottom walls 62, 64 of the attachment portion 44 to remove the tabs 58 from the openings 88. Preferably, a tool is required to remove the tabs 58 in this manner.

As best shown in FIGS. 1–3, the illustrated release member 42 is in the form of a control bar or towel bar. The illustrated towel bar 42 is a bar or tube bent into a U-shape having a handle 90 and a pair of arms 92 perpendicularly extending from the ends of the handle 90. End portions of the arms 92 extend through the flange openings 84, 86 of the latch release member attachment portion 78 such that the towel bar 42 is operably connected to the latches 40 for actuation thereof. The towel bar 42 is preferably retained within the flanges 80, 82 of the latch 40 in any suitable manner such as, for example an interlock between the towel bar and the latches 40. The towel bar 42 is also fully supported by the latches 40. It will be readily apparent to those skilled in the art, given the benefit of this disclosure, that that the release member 42 can be mounted in other manners such as, for example, the towel bar 42 can be hingedly attached to the upper track 30 and/or the release member 42 can actuate the latches 40 in other manners such as, for example, the towel bar 42 can slideably engage protrusions of the latches 40.

Figure 4:
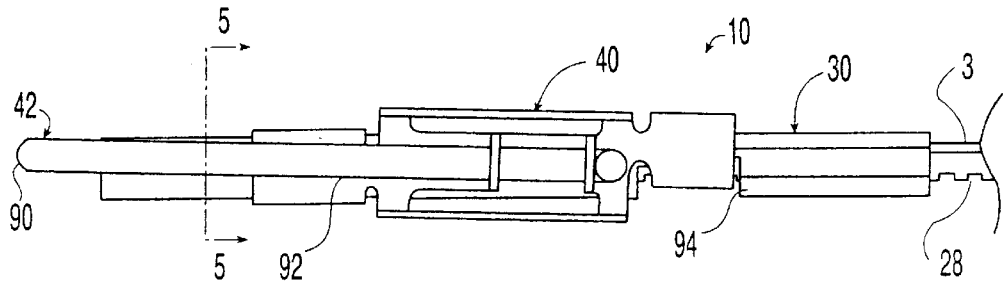
FIG. 4 is a fragmented left-side elevational view of the seat track assembly of FIGS. 1 to 3 similar to FIG. 2 but wherein the latch mechanism is in an unlatching position.
Figure 5:
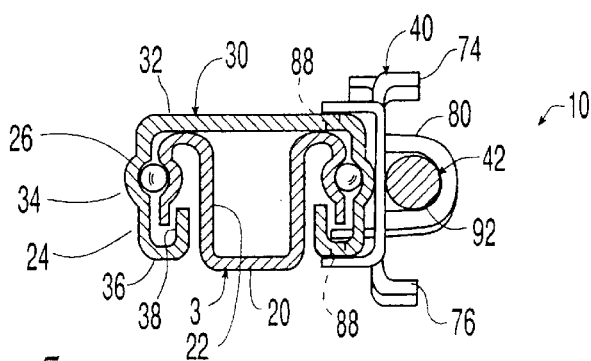
FIG. 5 is a cross-sectional view of the seat track assembly of FIGS. 1 to 3 taken along line 5—5 of FIG. 4.

As best shown in FIGS. 1–3, the latch portions 46 of the latches 40 extend through openings 94 in the upper tracks 30 such that selected locking teeth 28 of the lower track 18 extend into the windows 66 of the latch portions 46 to interlock the lower and upper tracks 18, 30. When it is desired to reposition the seat, the operator grasps the handle 90 of the towel bar 42 and pulls upward. As best shown in FIGS. 4 and 5, the upward movement of the handle 90 pivots the towel bar 42 and downwardly deflects or bends the legs 74, 76 of the latch intermediary portions 48 to downwardly move the latch portions 46 of the latches 40 to the unlatched position wherein the windows 66 are removed from the locking teeth 28. It is noted that the legs 74, 76 deflect such that the latches 40 operate as four-bar-linkages to move the latch portions 46 in the vertical direction to free the latch portions 46 of the locking teeth 28 while maintaining the latch portions 46 generally horizontal or parallel with the tracks 18, 30. With the latch portions 46 free of the locking teeth 28, the upper tracks 30 and the seat connected thereto are free to move in the forward-rearward direction to a desired location relative to the lower tracks 18. When the seat is in a desired location, the operator releases the towel bar 42 and the legs 74, 76 of the latches 40 resiliently return the latch portions 46 to the latching position wherein the locking teeth 28 are within the windows 66 and the seat and upper track 30 are locked in position relative to the lower track 18.

Figure 13:
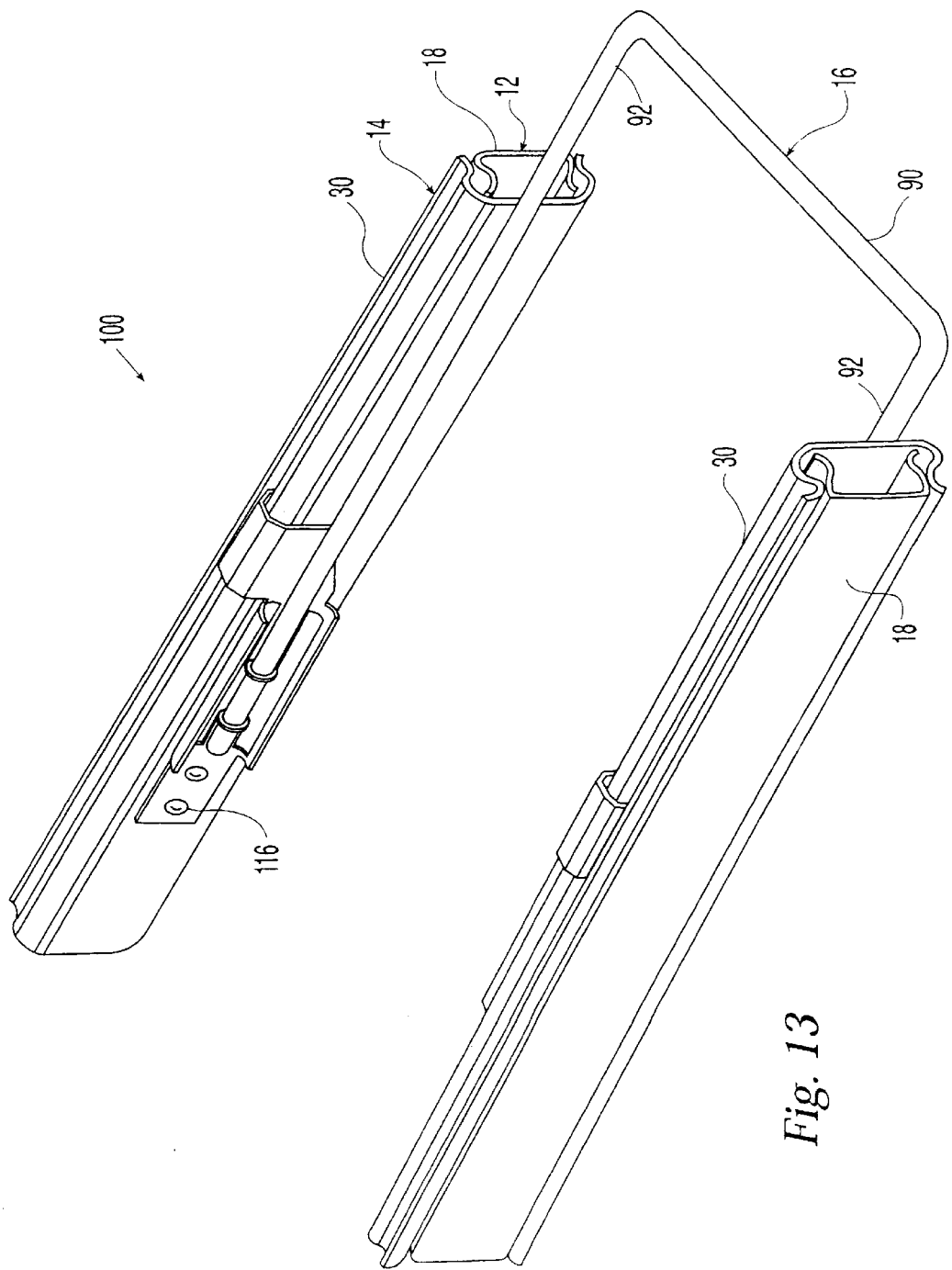
FIG. 13 is a perspective view of a seat track assembly according a second preferred embodiment of the present invention, wherein parts are removed for clarity.
Figure 14:
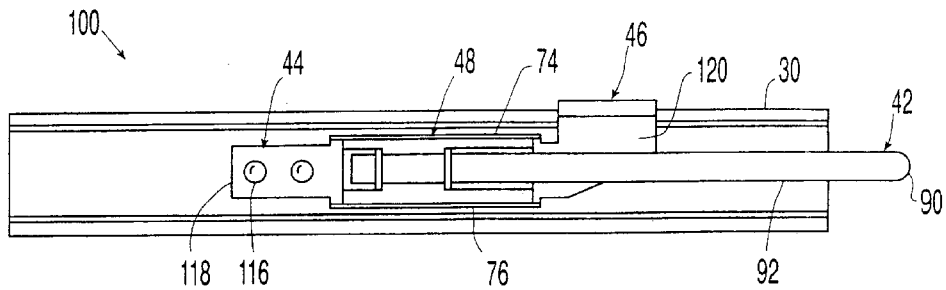
FIG. 14 is a fragmented right-side elevational view of the seat track assembly of FIG. 13, wherein a latch mechanism is in a latching position.
Figure 15:
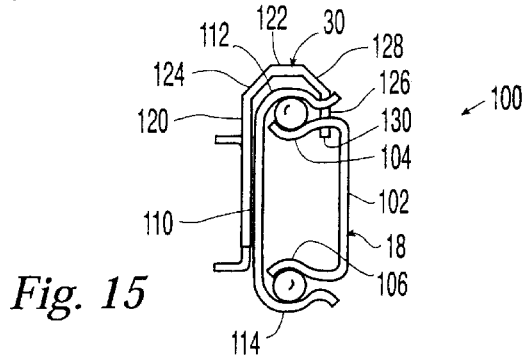
FIG. 15 is a cross-sectional view of the seat track assembly of FIGS. 12 and 14 taken along line 15—15 of FIG. 14, wherein some parts are removed for clarity.

FIGS. 13–18 illustrate a seat track assembly 100 according to a second preferred embodiment of the present invention wherein like reference numbers are used for like structure. It is noted that the seat track assembly 100 according to the second preferred embodiment is essentially the same as the seat track assembly 10 according to the first preferred embodiment except as noted hereinbelow. As best shown in FIGS. 13–15, this seat track assembly 100 also includes the first or lower track assembly 12 to be mounted in a fixed position relative to the motor vehicle floor, the second or upper track assembly 14 carrying a seat and movable relative to the lower track assembly 12, and the lock or latch mechanism 16 to secure the lower and upper track assemblies 12, 14 together and substantially prevent relative movement therebetween.

Figure 18:
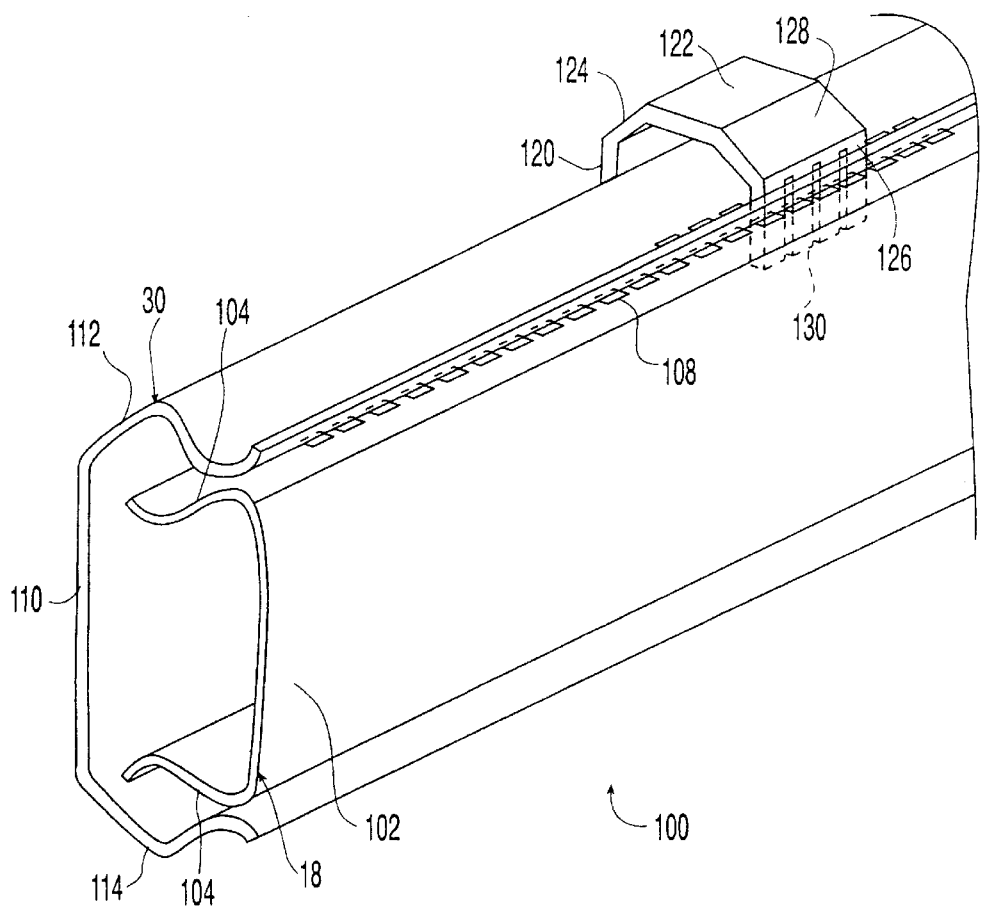
FIG. 18 is a fragmented perspective view of the latch mechanism of FIGS. 13–17 showing engagement of the latch with the tracks.
Figure 19:
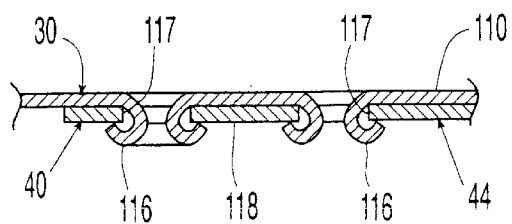
FIG. 19 is a cross-sectional view showing the attachment a latch of the latch mechanism of FIGS. 13–18.

The lower track assembly 12 includes at least two parallel and laterally spaced-apart lower slides or tracks 18. As best shown in FIG. 15, each illustrated lower track 18 is generally "lazy-U-shaped" and open at the outer side. The lower track 18 has a generally vertical side wall 102 and a pair of generally horizontal top and bottom walls 104, 106 outwardly extending form opposed upper and lower edges of the side wall 102. The top and bottom walls 104, 106 preferably form raceways for the bearings or balls 26 as described in more detail hereinafter. As best shown in FIG. 18, a plurality of longitudinally spaced-apart windows or openings 108 are provided in the top wall 104 of the lower track 18. The windows 108 are sized and shaped to cooperate with the latch mechanism 16 as described in more detail hereinafter. The walls 102, 104, 106 of the lower track 18 are preferably unitary, that is, formed from a single piece of material. The lower track 18 is formed of any suitable rigid material such as, for example, steel.

The upper track assembly 14 includes the at least two parallel and laterally spaced-apart upper slides or tracks 30 which are adapted to cooperate with corresponding lower tracks 18 such that they are slidable thereon. The illustrated upper tracks 30 are slidable over the lower tracks 18. As best shown in FIG. 15, each illustrated upper track 30 is generally "lazy-U-shaped" and open at the inner side. The lower track 30 has a generally vertical side wall 110 and generally horizontal top and bottom walls 112, 114 inwardly extending form opposed top upper and lower edges of the side wall 110. The upper track 30 is preferably sized and shaped to cooperate with the lower track 18 to slidably receive the lower track 18 therein with the top and bottom walls 112, 114 of the upper track disposed above and below the top and bottom walls 104, 106 of the lower track 18 respectively. The top and bottom walls 112, 114 preferably form raceways for the balls 26 such that the balls 26 are retained between the top and bottom walls 112, 114 of the upper track 30 and the top and bottom walls 104, 106 of the lower track 18 to facilitate relative sliding movement between the upper and lower tracks 18, 30. The walls 102, 104, 106 of the upper track 30 are preferably unitary, that is, formed from a single piece of material. The upper track 30 is formed of any suitable rigid material such as, for example, steel. It will be readily apparent to those skilled in the art, given the benefit of this disclosure, that that the lower and upper tracks 18, 30 can be modified to have many different shapes and sizes without falling outside the scope of the present invention.

The latch mechanism 16 includes the pair of locks or latches 40 secured to corresponding upper tracks 30 and a release member 42, such as the illustrated control arm or towel bar, operably connected to each of the latches 40 to selectively move the latches 40 from a latching position wherein the upper and lower tracks 18, 30 are interlocked to substantially prevent movement therebetween to an unlatched position wherein the upper tracks 30 are free to move relative to the lower tracks 18. The latches 40 are essentially mirror images of one another. Accordingly, further discussion will focus on one of the latches 40 with the understanding that the other latch 40 is constructed in substantially the same manner and operates in substantially the same manner. It will be readily apparent to those skilled in the art, given the benefit of this disclosure, that that only one of the latches 40 can be used eliminating the other or replacing it with a conventional or other latch.

Each latch 40 longitudinally extends along the outer side wall 34 of the corresponding upper track 30 and are symmetrically positioned along the upper tracks 30. Each latch 40 includes the attachment portion 44 for securing the latch 40 to the upper tack 30, the movable latch portion 46 for interlocking the lower and upper tracks 18, 30 when in the latching position, and the flexible intermediary or connection portion 48 connecting the attachment and latch portions 44, 46. The illustrated attachment portion 44 is adapted for connection with the upper track 30 by unitary mechanical fasteners, such as the illustrated unitary rivets 116 which are part of the upper track 30, so that the latch 40 is rigidly secured to the upper track 30 to substantially prevent relative movement therebetween. The side wall 110 of the upper track 30 is provided with a pair of the unitary rivets 116 which are initially generally conical-shaped extrusions which extend generally perpendicular from the side wall 110. The illustrated attachment portion 44 has generally vertical, planar side wall 118 which is provided with suitable openings 117 for receiving the unitary rivets 116. Once the conical-shaped extrusions are received in the openings 117, the free ends of the conical-shaped extrusions are deformed radially outward and folded back toward the side of the latch side wall 118 so that an interlock is formed therebetween which rigidly retains the latch attachment portion 44 to the upper track side wall 110. Alternatively, the attachment portion 44 can be attached in any suitable manner such as, for example, separate mechanical fasteners or a snap-fit connection such as described hereinabove with regard to the first embodiment of the present invention.

Figure 16:
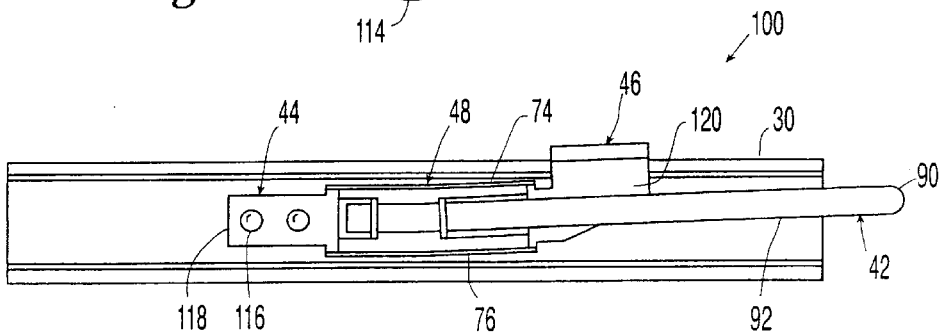
FIG. 16 is a fragmented right-side elevational view of the seat track assembly of FIGS. 13 to 15 similar to FIG. 14 but wherein the latch mechanism is in an unlatching position.

The illustrated movable latch portion 46 is adapted for cooperating with the windows 108 of the lower track 18 when in the latching position to interlock the lower and upper tracks 18, 30 and prevent relative movement therebetween. The illustrated latch portion 46 is generally inverted-J-shaped having the longer leg at an inner side. The attachment portion 46 has a generally vertical first or outer side wall 120, a generally horizontal top wall 122, a first angled wall 124 connecting the top edge of the outer side wall 120 with the outer edge of the top wall 122, a generally vertical second or inner side wall 126, and a second angled wall 128 connecting the inner edge of the top wall 122 and the upper edge of the inner side wall 126. The illustrated outer side wall 120 extends a further vertical distance than the inner side wall 126. As best shown in FIG. 16, the lower edge of the inner side wall 126 is provided with three spaced-apart locking teeth 130 sized and shaped to extend into three of the windows 108 formed in the top wall 104 of the lower track 18. Each locking tooth 130 forms opposed forward and rearward abutments for engaging the forward and rearward edges of the windows 108. It is noted that a fewer or greater number of locking teeth 130 can be utilized. It will be readily apparent to those skilled in the art, given the benefit of this disclosure, that that the latch portion 44 can be formed in other manners such as the windows 108 can be open on one side such that interlocking teeth are formed.

The flexible intermediary portion 48 is adapted to connect the attachment and latch portions 44, 46 and to permit resilient movement of the latch portion 46 between the latching position to the unlatching position. The illustrated intermediary portion 48 is substantially the same as described hereinabove with reference to the first embodiment of the present invention.

The latch 40 also preferably includes the unitary release member or towel bar attachment portion 78. The illustrated release member attachment portion 78 is substantially the same as described hereinabove with reference to the first embodiment of the present invention.

The latch 40 is preferably unitary, that is, formed from a single piece of material such as, for example, by stamping a flat cut out from sheet stock and then bending the cut out to obtain the desired latch. The latch 40 can be formed from any suitable resilient material such as, for example, spring steel.

As best shown in FIGS. 13–15, the illustrated release member 42 is in the form of a control bar or towel bar as described hereinabove with reference to the first embodiment of the present invention.

Figure 17:
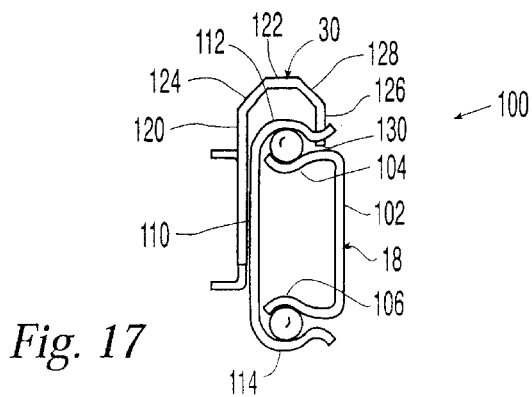
FIG. 17 is a cross-sectional view of the seat track assembly of FIGS. 13–15 taken along line 17—17 of FIG. 16, wherein some parts are removed for clarity.

As best shown in FIGS. 13–15 and 18, the locking teeth 130 of the latches 40 extend through openings 132 in the top walls 112 of the upper tracks 30 such that the locking teeth 132 extend into selected windows 108 of the latch portions 46 to interlock the lower and upper tracks 18, 30. When it is desired to reposition the seat, the operator grasps the handle 90 of the towel bar 42 and pulls upward. As best shown in FIGS. 16 and 17, the upward movement of the handle 90 pivots the towel bar 42 and upwardly deflects or bends the legs 74, 76 of the latch intermediary portions 48 to upwardly move the latch portions 46 of the latches 40 to the unlatched position wherein the locking teeth 130 are removed from the windows 108. With the locking teeth 130 free of the windows 108, the upper tracks 30 and the seat connected thereto are free to move in the forward-rearward direction to a desired location relative to the lower tracks 18. It is noted that when the latching portion 46 is in the unlatched position, the locking teeth 130 preferably remain in the openings 132 in the upper tracks 30. When the seat is in a desired location, the operator releases the towel bar 42 and the legs 74, 76 of the latches 40 resiliently return the latch portions 46 to the latching position wherein the locking teeth 130 are within the windows 108 and the seat and upper track 30 are locked in position relative to the lower track 18.

It is noted that each of the features of the preferred embodiments can be alternatively used on the other preferred embodiments if desired such as for example, the seat track assembly 10 according to the first embodiment can alternatively have a latch portion 46 with locking teeth and a lower track with cooperating windows and/or the seat track assembly 10 according to the first embodiment can have a latch attachment portion 44 which is adapted to be secured with unitary rivets such as illustrated by the seat track assembly 100 according to the second embodiment. Additionally, the seat track assembly 100 according to the second embodiment can alternatively have a latch portion 46 with windows and a lower track with cooperating locking teeth and/or the seat track assembly 100 according to the second embodiment can have a latch attachment portion 44 which is adapted to have a snap-fit connection with the upper track such as illustrated by the seat track assembly 10 according to the first embodiment.

From the foregoing disclosure and detailed description of certain preferred embodiments, it will be apparent that various modifications, additions and other alternative embodiments are possible without departing from the true scope and spirit of the present invention. For example, it will be apparent to those skilled in the art, given the benefit of the present disclosure, that the latch and tracks can each have many different configurations and can be formed of many different materials. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A seat track assembly comprising, in combination:
a first track assembly comprising a first track;
a second track assembly operably connected to the first track assembly and comprising a second track movable relative to the first track; and
a latch movable from a latching position wherein the second track is secured with respect to the first track and an unlatching position wherein the second track is movable with respect to the first track, the latch including an attachment portion secured to the second track, a latch portion adapted to cooperate with the first track to form an interlock therebetween and substantially prevent movement of the second track relative to the first track, and an intermediate portion connecting the attachment portion and the latch portion, wherein a snap-fit connection is provided between the attachment portion and the second track;
wherein the snap fit connection includes one of the attachment portion and the second track having a protrusion which engages the other of the attachment portion and the second track to form an interference which secures the attachment portion to the second track and one of the attachment portion and the second track having a resiliently deflectable portion such that the deflectable portion deflects to remove the interference as the attachment portion and the second track are brought together and resiliently snaps back to reform the interference when the attachment portion is secured to the second track.

2. A seat track assembly comprising, in combination:
a first track assembly comprising a first track;
a second track assembly operably connected to the first track assembly and comprising a second track movable relative to the first track; and
a latch movable from a latching position wherein the second track is secured with respect to the first track and an unlatching position wherein the second track is movable with respect to the first track, the latch including an attachment portion secured to the second track, a latch portion adapted to cooperate with the first track to form an interlock therebetween and substantially prevent movement of the second track relative to the first track, and an intermediate portion connecting the attachment portion and the latch portion, wherein a snap-fit connection is provided between the attachment portion and the second track;
wherein the attachment portion is generally channel-shaped having a pair of resiliently deflectable walls and the attachment portion is sized to partially encircle the second track.

3. The seat track assembly according to claim 2, wherein the second track has a top wall, a side wall, and a bottom wall and the attachment portion extends over at least a portion of each of the top, side and bottom walls of the second track.

4. The seat track assembly according to claim 2, wherein the resiliently deflectable walls each have at least one bent tab forming an abutment.

5. A seat track assembly comprising, in combination:
a first track assembly comprising a first track;
a second track assembly operably connected to the first track assembly and comprising a second track movable relative to the first track; and
a latch movable from a latching position wherein the second track is secured with respect to the first track and an unlatching position wherein the second track is movable with respect to the first track, the latch including an attachment portion secured to the second track, a latch portion adapted to cooperate with the first track to form an interlock therebetween and substantially prevent movement of the second track relative to the first track, and an intermediate portion connecting the attachment portion and the latch portion, wherein a snap-fit connection is provided between the attachment portion and the second track;
wherein the second track has a top wall, a side wall, and a bottom wall and the attachment portion of the latch extends over at least a portion of each of the top, side, and bottom walls of the second track.

6. A seat track assembly comprising, in combination:
a first track assembly comprising a first track;
a second track assembly operably connected to the first track assembly and comprising a second track movable relative to the first track; and
a latch movable from a latching position wherein the second track is secured with respect to the first track and an unlatching position wherein the second track is movable with respect to the first track, the latch including an attachment portion secured to the second track, a latch portion adapted to cooperate with the first track to form an interlock therebetween and substantially prevent movement of the second track relative to the first track, and an intermediate portion connecting the attachment portion and the latch portion, wherein the intermediate portion forms a four bar linkage with the attachment and latch portions such that the latch portion remains parallel with the first track upon movement between the latching position and the unlatching position.

7. The seat track assembly according to claim 6, wherein a snap-fit connection is provided between the attachment portion and the second track.

8. The seat track assembly according to claim 6, wherein the latch portion has a generally horizontal wall and at least one window formed in the wall to cooperate with the first track to form the interlock.

9. The seat track assembly according to claim 6, wherein the latch portion has a generally vertical wall and at least one locking tooth formed in the wall to cooperate with the first track to form the interlock.

10. A seat track assembly comprising, in combination:
a first track assembly comprising a first track;
a second track assembly operably connected to the first track assembly and comprising a second track movable relative to the first track, the first track having a generally vertical side wall; and
a latch movable from a latching position wherein the second track is secured with respect to the first track and an unlatching position wherein the second track is movable with respect to the first track, the latch including an attachment portion secured to the second track, a latch portion adapted to cooperate with the first track to form an interlock therebetween and substantially prevent movement of the second track relative to the first track, and an intermediate portion connecting the attachment portion and the latch portion, wherein the intermediate portion longitudinally extends laterally adjacent the side wall of the second track;
wherein the second track has a generally horizontal top wall and a generally horizontal bottom wall and the attachment portion of the latch extends over at least a portion of each of the top, side, and bottom walls of the second track.

11. The seat track assembly according to claim 10, wherein the attachment portion is generally channel-shaped having a pair of resiliently deflectable walls and the attachment portion is sized to partially encircle the second track.

12. A seat track assembly comprising, in combination:
a first track assembly comprising a first track;
a second track assembly operably connected to the first track assembly and comprising a second track movable relative to the first track, the first track having a generally vertical side wall; and
a latch movable from a latching position wherein the second track is secured with respect to the first track and an unlatching position wherein the second track is movable with respect to the first track, the latch including an attachment portion secured to the second track, a latch portion adapted to cooperate with the first track to form an interlock therebetween and substantially prevent movement of the second track relative to the first track, and an intermediate portion connecting the attachment portion and the latch portion, wherein the intermediate portion longitudinally extends laterally adjacent the side wall of the second track;
wherein the intermediate portion includes at least one leaf spring located laterally adjacent the side wall of the second track.

13. A seat track assembly comprising, in combination:
a first track assembly comprising a first track;
a second track assembly operably connected to the first track assembly and comprising a second track movable relative to the first track, the first track having a generally vertical side wall; and
a latch movable from a latching position wherein the second track is secured with respect to the first track and an unlatching position wherein the second track is movable with respect to the first track, the latch including an attachment portion secured to the second track, a latch portion adapted to cooperate with the first track to form an interlock therebetween and substantially prevent movement of the second track relative to the first track, and an intermediate portion connecting the attachment portion and the latch portion, wherein the intermediate portion longitudinally extends laterally adjacent the side wall of the second track;
wherein the intermediate portion includes a pair of vertically spaced apart leaf springs located laterally adjacent the side wall of the second track.

14. A seat track assembly comprising, in combination:
a first track assembly comprising a first track;
a second track assembly operably connected to the first track assembly and comprising a second track movable relative to the first track; and
a latch movable from a latching position wherein the second track is secured with respect to the first track and an unlatching position wherein the second track is movable with respect to the first track, the latch including an attachment portion secured to the second track, a latch portion adapted to cooperate with the first track to form an interlock therebetween and substantially prevent movement of the second track relative to the first track, and an intermediate portion connecting the attachment portion and the latch portion, wherein the intermediate portion includes a pair of longitudinally extending, parallel and vertically spaced apart legs which form a double leaf spring to bias the latch portion toward the latching position.

15. The seat track assembly according to claim 14, wherein the second track has a generally vertical side wall and the latch longitudinally extends laterally adjacent the side wall of the second track.

16. The seat track assembly according to claim 15, wherein the double leaf spring is located laterally adjacent the side wall of the second track.

17. The seat track assembly according to claim 14, wherein the second track has a generally vertical side wall and the double leaf spring is located laterally adjacent the side wall of the second track.

18. The seat track assembly according to claim 14, wherein a snap-fit connection is provided between the attachment portion and the first track.

19. The seat track assembly according to claim 14, wherein the pair of legs of the intermediate portion are each generally planar.

20. The seat track assembly according to claim 14, further comprising a control arm operably engaging the latch wherein a portion of the control extends adjacent the latch intermediate portion at a vertical height between the pair of legs of the intermediate portion.

* * * * *